UNITED STATES PATENT OFFICE.

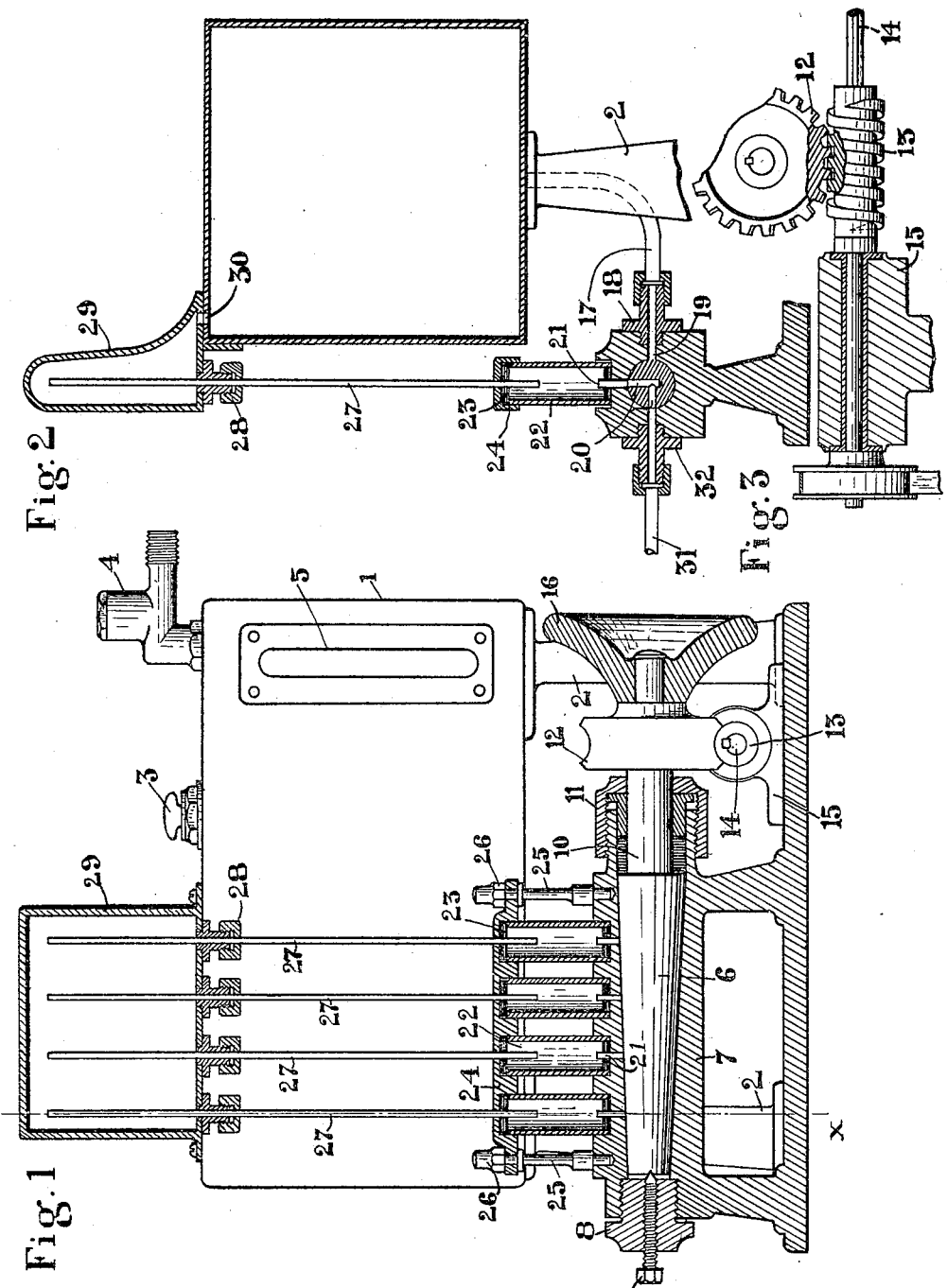

JOHN B. PURVIS AND JAMES G. PURVIS, OF DETROIT, MICHIGAN.

LUBRICATOR.

946,580.  Specification of Letters Patent.  Patented Jan. 18, 1910.

Application filed March 25, 1909. Serial No. 485,578.

*To all whom it may concern:*

Be it known that we, JOHN B. PURVIS and JAMES G. PURVIS, citizens of the United States of America, residing at Detroit, in the county of Wayne and State of Michigan, have invented certain new and useful Improvements in Lubricators, of which the following is a specification, reference being had therein to the accompanying drawings.

This invention relates to a force feed oiler and to certain features thereof whereby the supply of oil may be regulated easily, and whereby lubricant may be supplied to the machine to which the oiler is attached when the machine is stationary, if desired.

The invention consists in the matters hereinafter set forth and more particularly pointed out in the appended claims.

In the drawings, Figure 1 is a view partially in longitudinal section and partially in elevation of an oiler embodying features of the invention. Fig. 2 is a view in section on line x—x of Fig. 1. Fig. 3 is a view in detail of a driving worm and shaft.

Referring to the drawings, a closed reservoir 1 is mounted on suitable standards 2 and has a supply plug 3 on its top together with an inlet check valve 4 which may be connected to the exhaust of a gasolene engine or to the steam pipe of a steam engine or any other suitable source of pressure. A view slot 5 in the side of the reservoir covered by a suitable glass plate shows the level of the lubricant therein.

A tapered plug 6 is journaled in a suitable barrel bearing 7 below the reservoir so that it forms a tight joint therewith, a take up cap 8 on the small end of the plug with thrust pivot pin 9 permitting accurate adjustment of the plug so that it will turn readily in the barrel without leaking. A stem 10 from the larger end of the plug passing through a suitable stuffing box 11 carries a worm wheel 12 meshing with a worm 13 which is non-rotatably reciprocable longitudinally on a shaft 14 that may be connected operatively in any desired way to the machine on which the oiler is placed. An end thrust bearing 15 prevents the movement of the worm on its shaft 14 when it is being turned to rotate the worm wheel 12 and a hand wheel 16 on the stem 10 beyond the worm enables the plug 6 to be rotated by the hand in proper direction, the worm sliding along the shaft 14 out of mesh with the wheel when the hand wheel 16 is used to rotate the stem 10 in the opposite direction in which it is driven by the worm wheel 12.

A number of feed pipes 17 extend from the base of the reservoir 1 to the barrel 7 to which they are connected by suitable nipples 18, inlet ducts 19 in the barrel leading from the nipples being adapted to register with ports 20 formed in the plug 6. The ports 20 have their inlets and outlets disposed a quarter of a circumference apart so that when the inlet mouth of one registers with the adjacent duct 19 its outlet is in communication with an upright tube 21 leading through the barrel 7 into a sight tube 22. The sight tubes 22 which correspond in number to the pipes 17 are secured in place between suitable gaskets 23 by a clamping bar 24 held in any suitable manner, as for example, studs 25 and cap nuts 26. Air tubes 27 extend through apertures in the cap plate 24 over each sight tube and through packing glands 28 near the top of the reservoir into a suitable hollow cap 29 secured in any preferred manner on top of the reservoir and in communication therewith through an opening 30. The air tubes 27 may be adjusted longitudinally by slipping them up or down through the glands 28 the depth of oil in each sight tube being determined by the distance of the lower end of its air tube above its feed pipe 21. The ports 20 passing through the plug 6 are also adapted to simultaneously register with the pipes 21 and discharge pipes 31 extending from the barrel 7 to which they are connected by suitable nipples 32 whose axial apertures are extended through the barrel to the face of the plug.

In operation, the check valve 4 of the reservoir is connected to any source of air or steam pressure and a quarter revolution of the plug 6 either by hand, if the machinery is stationary, or through the worm wheel, allows a definite quantity of oil to flow into the sight tubes, the depth of lubricant in each being determined by the vertical position of its air tube; the further revolution of the plug throws each sight tube into communication with the discharge pipe, the air or steam pressure in the reservoir ejecting the lubricant forcibly. If the machinery is not running, the operator may by manipulation of the hand wheel force the lubricant into the bearings before the machinery is started if he so desires.

A feature of the invention is the ease of adjustment of the amount of lubricant ejected through each discharge pipe without the use of tools or special appliances. Another feature is the fact that the oiler may be used by hand when the machine to which it is attached is standing still. In either case, the supply to the sight glass is not effected by any pressure under which the oiler may be working while its discharge is as effective as that of any of the complicated force feed oilers ordinarily used.

Obviously, changes in the details of construction may be made without departing from the spirit of the invention, and we do not care to limit ourselves to any particular form or arrangement of parts.

What we claim as our invention is:—

1. A lubricator comprising a closed reservoir, feed pipes from the bottom thereof, sight tubes below the reservoir, air tubes each in communication at its upper end with the upper part of the reservoir and in sliding connection at its lower end with the upper end of a sight tube, discharge pipes, a single rotatable closure adapted to connect the sight tubes alternately with the feed pipes and with the discharge pipes, mechanism for rotating the closure, and means for manually turning the closure adapted to throw the said mechanism out of gear.

2. A lubricator comprising a closed reservoir, feed pipes from the bottom thereof, sight tubes below the reservoir, air tubes each in communication at its upper end with the upper part of the reservoir and in sliding connection at its lower end with the upper end of a sight tube, discharge pipes, a single rotatable closure adapted to connect the sight tubes alternately with the feed pipes and with the discharge pipes, a shaft, a worm non-rotatably connected with and longitudinally reciprocable thereon, a worm-wheel on the closure normally in mesh with the worm, a hand-wheel on the closure, and a thrust bearing adapted to maintain the worm in operative relation to the gear when it is driving the latter, and to permit the worm to move on the shaft when the hand-wheel rotates the worm gear in the opposite direction.

3. A lubricator comprising a closed reservoir, a hollow cap on the reservoir in communication with the upper part thereof, feed pipes from the bottom of the reservoir, sight tubes below the reservoir, air tubes whose lower ends have sliding connection with the upper ends of the sight tubes and whose upper ends have sliding connection with the cap which they enter, discharge pipes, a barrel bearing connected to the sight tubes, a closure rotatable therein which is adapted to connect the sight tubes alternately with the feed pipes and discharge pipes, mechanism for rotating the closure, and means for manually turning the closure independently of the mechanism and adapted to throw the mechanism out of gear.

4. A lubricator comprising a closed reservoir, a hollow cap on the reservoir in communication with the upper part thereof, feed pipes from the bottom of the reservoir, sight tubes below the reservoir, air tubes whose lower ends have sliding connection with the upper ends of the sight tubes and whose upper ends have sliding connection with the cap which they enter, discharge pipes, a barrel bearing connected to the sight tubes, a closure rotatable therein which is adapted to connect the sight tubes alternately with the feed pipes and discharge pipes, a shaft, a worm non-rotatably connected therewith and longitudinally reciprocable thereon, a worm-wheel on the closure normally in mesh with the worm, a hand-wheel on the closure, and a thrust bearing adapted to maintain the worm in operative relation to the gear when it is driving the latter and to permit the worm to move on the shaft when the hand-wheel rotates the worm gear in the opposite direction.

5. A lubricator comprising a closed reservoir, a check valve inlet thereto, a hollow cap in communication with the top of the reservoir extending over the side thereof, a horizontal barrel bearing below the cap and reservoir base, a series of sight tubes extending upwardly from the barrel, air tubes whose lower ends extend through packing glands closing the upper ends of the sight tubes and whose upper ends pass through packing glands into the cap, whereby they are independently adjustable longitudinally, feed pipes connecting the base of the reservoir and the barrel, discharge pipes from the barrel, a single closure rotatable in the barrel adapted to connect the sight tubes alternately with the feed pipes and the discharge pipes, mechanism for rotating the closure, and means for manually turning the closure independently of the mechanism and adapted to throw the mechanism out of gear.

6. A lubricator comprising a closed reservoir, a hollow cap on the reservoir in communication with the upper part thereof, feed pipes from the bottom of the reservoir, sight tubes below the reservoir, air tubes whose lower ends have sliding connection with the upper ends of the sight tubes and whose upper ends have sliding connection with the cap which they enter, discharge pipes, a horizontal taper-bored valve barrel bearing with which the sight, discharge and feed-pipes are connected, a cap adjustably secured in the smaller end of the barrel bore, a thrust pin adjustable longitudinally in the cap, a closure journaled in the barrel with its smaller end bearing against the pin and provided with ports adapted to connect the sight tubes alternately with the feed and discharge pipes, an axial stem extending from the larger end of the closure, a worm gear secured thereon, a shaft transverse to the closure axis, a worm non-rotatably connected therewith and longitudinally reciprocable thereon, a hand-wheel on the closure stem, and a thrust bearing engaged by the worm when it is driving the gear.

In testimony whereof we affix our signatures in presence of two witnesses.

JOHN B. PURVIS.
JAMES G. PURVIS.

Witnesses:
C. R. STICKNEY,
A. M. SHANNON.